United States Patent
Parikka et al.

(10) Patent No.: US 9,747,558 B2
(45) Date of Patent: Aug. 29, 2017

(54) METHOD AND SYSTEM FOR USING AND INSPECTING E-TICKETS ON A USER TERMINAL

(71) Applicant: W-ZUP Communication Oy, Palokka (FI)

(72) Inventors: Mika Petteri Parikka, Helsinki (FI); Jussi Severi Palovaara, Palokka (FI); Tommi Tapani Kolehmainen, Vantaa (FI); Samuel Petri Santeri Jouttijärvi, Jyväskylä (FI)

(73) Assignee: W-Zup Communication Oy, Palokka (FI)

( * ) Notice: Subject to any disclaimer, the term of this patent is extended or adjusted under 35 U.S.C. 154(b) by 676 days.

(21) Appl. No.: 14/295,859

(22) Filed: Jun. 4, 2014

(65) Prior Publication Data

US 2015/0356466 A1     Dec. 10, 2015

(51) Int. Cl.
*G06Q 10/00* (2012.01)
*G06Q 10/02* (2012.01)
(Continued)

(52) U.S. Cl.
CPC ........... *G06Q 10/02* (2013.01); *G06F 3/0484* (2013.01); *G06F 3/016* (2013.01)

(58) Field of Classification Search
CPC ... G06Q 10/02; G06F 3/0484; G06F 3/04883; G06F 21/30; G06F 21/62; G06F 3/016; G06F 3/017; G07B 15/00; G07B 11/11
See application file for complete search history.

(56) References Cited

U.S. PATENT DOCUMENTS

2001/0018660 A1\* 8/2001 Sehr .................. G06Q 10/02
                                                                    705/5
2002/0040308 A1    4/2002 Hasegawa et al.
(Continued)

FOREIGN PATENT DOCUMENTS

JP    GB 2502678 A  * 12/2013  ............. G06Q 10/02
WO    2009/141614 A1    11/2009

OTHER PUBLICATIONS

Sabre, Sabre Launches Mobile App for Travel Agents, Nov. 6, 2013, available at https://www.sabre.com/insights/sabrelaunches mobileappfortravelagents/.*
(Continued)

*Primary Examiner* — Daniel Vetter
(74) *Attorney, Agent, or Firm* — Ziegler IP Law Group, LLC (57) ABSTRACT

A method for inspecting an e-ticket on a mobile communication device of a user, including rendering the e-ticket on a display of the mobile communication device, wherein the e-ticket includes a ticket information area for displaying user related information, and a ticket validation area for displaying inspection related information when at least one predefined condition is met, enabling a ticket inspector to execute a checking gesture in the ticket validation area when the ticket inspector ascertains one or more predefined identifiers in the ticket validation area, displaying a confirmation code in the ticket validation area, upon execution of the checking gesture, enabling the ticket inspector to execute a confirmation gesture in the ticket validation area when the displayed confirmation code matches a predefined confirmation code, and marking the e-ticket as used upon execution of the confirmation gesture.

31 Claims, 10 Drawing Sheets

(51) Int. Cl.
*G06F 3/0484* (2013.01)
*G06F 3/01* (2006.01)

(56) References Cited

U.S. PATENT DOCUMENTS

| | | | |
|---|---|---|---|
| 2003/0172037 A1 | 9/2003 | Jung et al. | |
| 2004/0030658 A1 | 2/2004 | Cruz | |
| 2007/0150842 A1* | 6/2007 | Chaudhri | G06F 3/04883 715/863 |
| 2007/0260543 A1 | 11/2007 | Chappuis | |
| 2008/0170776 A1* | 7/2008 | Albertson | G06F 21/35 382/154 |
| 2010/0082491 A1* | 4/2010 | Rosenblatt | G06Q 10/02 705/65 |
| 2011/0208418 A1* | 8/2011 | Looney | G06Q 30/06 701/532 |
| 2011/0299744 A1* | 12/2011 | Kountotsis | G06K 9/00013 382/124 |
| 2012/0009896 A1* | 1/2012 | Bandyopadhyay | G06F 1/1643 455/411 |
| 2012/0078667 A1* | 3/2012 | Denker | G06Q 10/02 705/5 |
| 2012/0129511 A1* | 5/2012 | Hsu | H04M 1/66 455/418 |
| 2013/0060687 A1* | 3/2013 | Bak | G06Q 20/20 705/41 |
| 2013/0060708 A1* | 3/2013 | Oskolkov | G06Q 20/3223 705/75 |
| 2013/0194223 A1* | 8/2013 | Ward | G06F 1/3262 345/174 |
| 2013/0262161 A1* | 10/2013 | Matsuda | G06Q 10/02 705/5 |
| 2013/0326582 A1* | 12/2013 | Kruzeniski | G06F 21/6209 726/2 |
| 2014/0022176 A1* | 1/2014 | Chen | G06F 3/04886 345/168 |
| 2014/0068755 A1* | 3/2014 | King | G06F 21/53 726/19 |
| 2014/0084059 A1* | 3/2014 | Sierchio | G06K 19/0719 235/380 |
| 2014/0184471 A1* | 7/2014 | Martynov | G06F 3/1423 345/1.2 |
| 2014/0309871 A1* | 10/2014 | Ricci | B60Q 1/00 701/36 |
| 2014/0364148 A1* | 12/2014 | Block | H04W 4/02 455/456.3 |
| 2015/0012305 A1* | 1/2015 | Truskovsky | G06Q 10/02 705/5 |
| 2015/0058220 A1* | 2/2015 | Cazanas | G06Q 20/40 705/44 |
| 2015/0074506 A1* | 3/2015 | Dunn | G06F 21/6218 715/230 |

OTHER PUBLICATIONS

Sabre, Sabre Red Mobile Workspace, WebArchive copy dated Dec. 22, 2013, available at http://www.sabretravelnetwork.com/home/solutions/products/sabre_red_mobile_workspace.*

* cited by examiner

METHOD AND SYSTEM FOR USING AND INSPECTING E-TICKETS ON A USER TERMINAL

TECHNICAL FIELD

The presently disclosed embodiments relate to electronic tickets ("e-tickets"), and more specifically relate to using and inspecting e-tickets on a user terminal.

BACKGROUND

The term "ticket" as used herein, generally refers to a voucher which authorizes a user to use a service, or access a place or an event. The ticket may be a travel pass, a flight ticket, a concert pass, a car parking ticket, a movie ticket, etc. An electronic ticket (e-ticket) is a ticket which is in electronic form and is stored in an electronic storage medium, such as in a mobile communication device of the user. Generally, a user has to carry a photo identification proof along with the e-ticket to prove to a ticket inspector that the user is the owner of the e-ticket. However, carrying a photo identification proof is cumbersome, and the user may fail to prove their identity, if they forget to carry the identification proof. Also, the ticket inspector has to separately notify and update a ticket issuing system that the e-ticket has been checked and used.

Alternatively, the e-tickets may include a QR/barcode and may be inspected using a ticket reader that has QR/barcode recognition capability and is connected to a server system/ database which contains information about the issued tickets. Every time an e-ticket is read by the ticket reader, the ticket reader may be automatically marked as checked and used in the database. However, the ticket reader devices are expensive and need to be connected to a communication network such as the Internet. Therefore, it may not be economical and practically possible to equip all the ticket inspecting sites with the ticket reader devices.

Thus, there is a need for an e-ticket inspection system that eliminates the need for an external ticket reader device and allows the automatic updating of used tickets in the ticket issuing system.

SUMMARY

The present disclosure seeks to provide a computer implemented method for inspecting an e-ticket on a mobile communication device of a user.

The present disclosure also seeks to provide a system for facilitaitng inspection of an e-ticket on a mobile communication device of a user.

In one aspect, embodiments of the present disclosure provide a method for inspecting an e-ticket on a mobile communication device of a user. The method includes rendering the e-ticket on a display of the mobile communication device, wherein the e-ticket includes a ticket information area for displaying user related information, and a ticket validation area for displaying inspection related information. When at least one predefined condition is met, the method includes enabling a ticket inspector to execute a checking gesture in the ticket validation area when the ticket inspector ascertains one or more predefined identifiers in the ticket validation area, displaying a confirmation code in the ticket validation area, upon execution of the checking gesture, enabling the ticket inspector to execute a confirmation gesture in the ticket validation area when the displayed confirmation code matches a predefined confirmation code, and marking the e-ticket as used upon execution of the confirmation gesture, and allowing the user to access activity corresponding to the e-ticket.

In an embodiment of the present disclosure, the method further includes prompting the user to show the e-ticket to the ticket inspector when the inspection related information is displayed in the ticket validation area.

In an embodiment of the present disclosure, the user related information includes at least one of: title, schedule, service provider, duration, location, date, time and price of the event.

In an embodiment of the present disclosure, the inspection related information is stored in a hidden and/or encrypted form in a memory of the mobile communication device, till the at least one predefined condition is met.

In an embodiment of the present disclosure, the inspection related information is automatically retrieved from a ticket issuing server, when the at least one predefined condition is met.

In an embodiment of the present disclosure, a predefined condition is one of: a ticket issuing server issuing a bring-up signal for the mobile communication device, and the user submitting a request on the display for bringing up the e-ticket.

In an embodiment of the present disclosure, the ticket issuing server issues the bring-up signal, when at least one notification criteria is satisfied, a notification criteria being one of: the mobile communication device being present at a predefined location, a current time of mobile communication device being a predefined time, and the mobile communication device being close to a radio beacon.

In an embodiment of the present disclosure, the method further includes checking a status, validity and the at least one notification criteria of the e-ticket, when the user submits the request for bringing up the e-ticket.

In an embodiment of the present disclosure, the confirmation code includes at least one of: audible code, visual signal, and tactile signal.

In an embodiment of the present disclosure, the method further includes enabling the user to enter a password to display the inspection related information in the ticket validation area.

In an embodiment of the present disclosure, the checking gesture is one of: sliding finger from left to right in the ticket validation area, sliding finger from right to left in the ticket validation area, sliding finger from top to bottom in the ticket validation area, sliding finger from bottom to top in the ticket validation area and sliding finger to form an L in the ticket validation area.

In an embodiment of the present disclosure, the method further includes providing feedback to the ticket inspector during execution of the checking gesture, the feedback including at least one of: visual, audible and tactile signal.

In an embodiment of the present disclosure, the checking gesture, the confirmation code, and the confirmation gesture are e-ticket specific.

In an embodiment of the present disclosure, the e-ticket is issued to the user for an activity extending for a predefined time period.

In an embodiment of the present disclosure, the method further includes rendering a countdown timer of the predefined time period on the display of the mobile communication device, enabling the ticket inspector to input a passcode in the ticket validation area upon execution of the checking gesture, displaying a temporary confirmation code in the ticket validation area upon input of the passcode, the temporary confirmation code being a function of the passcode and e-ticket type, and marking the e-ticket as valid, and allowing the user to use the e-ticket till an expiry of the predefined period.

In another aspect, embodiments of the present disclosure provide a system for facilitating inspection of an e-ticket on a mobile communication device of a user. The system includes a processor and a non-transitory computer readable medium that includes program code stored thereon. The processor is configured to execute the program code to render the e-ticket on a display of the mobile communication device, wherein the e-ticket includes a ticket information area for displaying user related information, and a ticket validation area for displaying inspection related information when at least one predefined condition is met, and enable a ticket inspector to execute a checking gesture in the ticket validation area when the ticket inspector ascertains one or more predefined identifiers in the ticket validation area, display a confirmation code in the ticket validation area, upon execution of the checking gesture, enable the ticket inspector to execute a confirmation gesture in the ticket validation area when the displayed confirmation code matches a predefined confirmation code, and mark the e-ticket as used upon execution of the confirmation gesture, and allowing the user to attend event corresponding to the e-ticket.

Embodiments of the present disclosure enable inspection of the e-ticket on a mobile communication device equipped with a touchscreen, without requiring an external reader device, and without the requirement of the user carrying an identification proof. The mobile communication device facilitates inspection of the e-ticket without the need of connecting to a communication network during inspection of the ticket. The disclosed embodiments further prevent the usage of the e-ticket in a wrong place and time, thereby improving security and user experience, and protecting the e-ticket from being accidentally de-authorized/used/deleted.

BRIEF DESCRIPTION OF THE FIGURES

The summary above, as well as the following detailed description of illustrative embodiments, is better understood when read in conjunction with the appended drawings. For the purpose of illustrating the present disclosure, example constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION

The following detailed description illustrates embodiments of the present disclosure and methods by which they can be implemented. Although the best mode of carrying out the present disclosure has been disclosed, those skilled in the art would recognize that other embodiments for carrying out or practicing the present disclosure are also possible.

Embodiments of the present disclosure provide a method for inspecting an e-ticket on a mobile communication device of a user. The method includes rendering the e-ticket on a display of the mobile communication device, wherein the e-ticket includes a ticket information area for displaying user related information, and a ticket validation area for displaying inspection related information when at least one predefined condition is met, enabling a ticket inspector to execute a checking gesture in the ticket validation area when the ticket inspector ascertains one or more predefined identifiers in the ticket validation area, displaying a confirmation code in the ticket validation area, upon execution of the checking gesture, enabling the ticket inspector to execute a confirmation gesture in the ticket validation area when the displayed confirmation code matches a predefined confirmation code, and marking the e-ticket as used upon execution of the confirmation gesture, and allowing the user to access activity corresponding to the e-ticket.

Additionally, there is provided a system for facilitating inspection of an e-ticket on a mobile communication device of a user. The system includes a processor, and a non-transitory computer readable medium including program code stored thereon. The processor is configured to execute the program code in order to render the e-ticket on a display of the mobile communication device, wherein the e-ticket includes a ticket information area for displaying user related information, and a ticket validation area for displaying inspection related information when at least one predefined condition is met, enable a ticket inspector to execute a checking gesture in the ticket validation area when the ticket inspector ascertains one or more predefined identifiers in the ticket validation area, display a confirmation code in the ticket validation area, upon execution of the checking gesture, enable the ticket inspector to execute a confirmation gesture in the ticket validation area when the displayed confirmation code matches a predefined confirmation code, and mark the e-ticket as used upon execution of the confirmation gesture, and allowing the user to attend event corresponding to the e-ticket.

Embodiments of the present disclosure substantially eliminate, or at least partially address, problems in the prior art, enabling the inspection of an e-ticket without the need of an external reader device and without the requirement of the user carrying an identification proof.

Modifications to embodiments of the present disclosure described herein are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Figure 1:
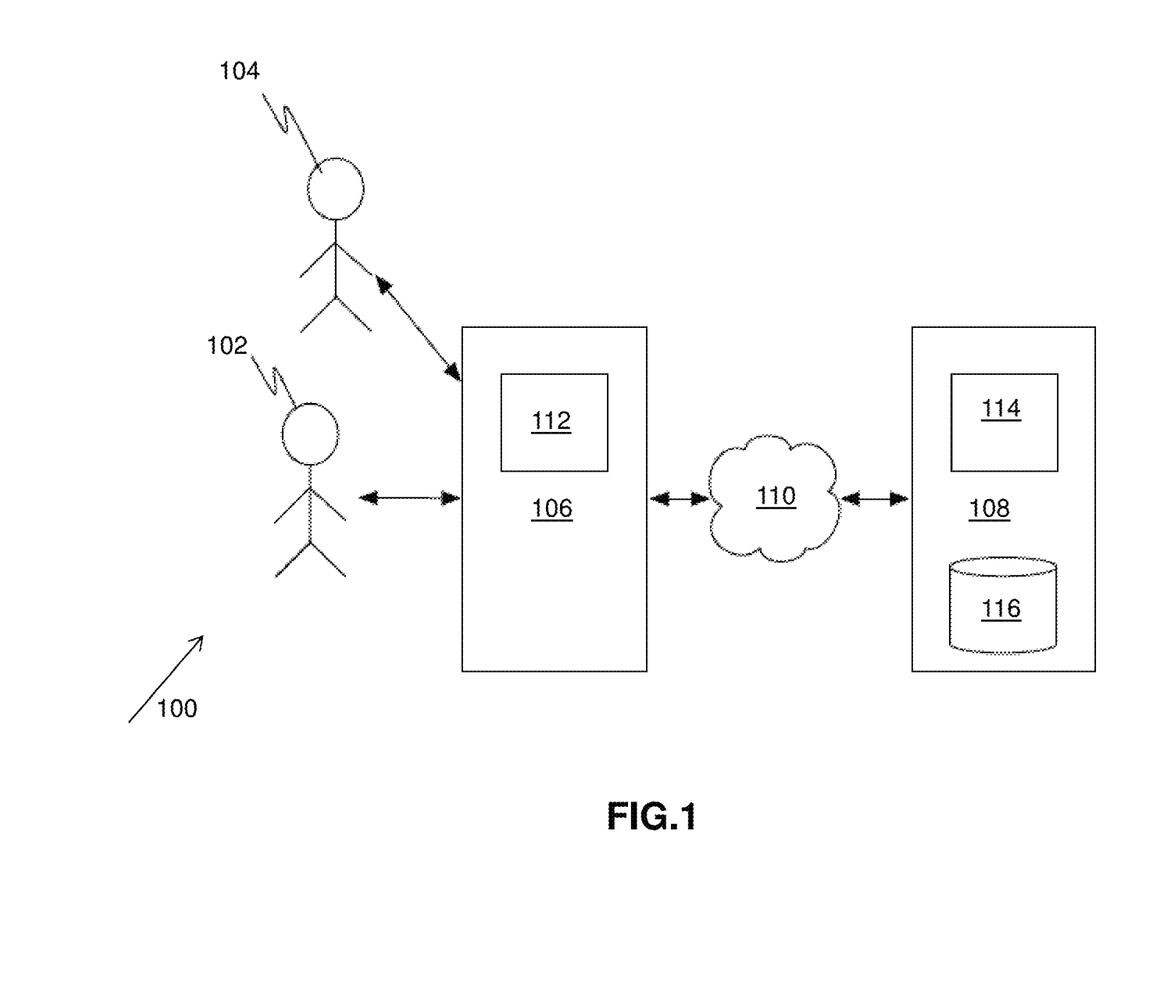
FIG. 1 is an illustration of a system for facilitating issuing and inspection of an e-ticket, in accordance with an embodiment of the present disclosure.

Referring now to the drawings, particularly by their reference numbers, FIG. 1 is an illustration of a system 100 for facilitating issuing and inspection of an e-ticket, in accordance with an embodiment of the present disclosure. The system 100 includes a mobile communication device 106 and a ticket issuing server 108 communicatively coupled to the mobile communication device 106 through the communication network 110. In one embodiment, a ticket user 102 is associated with the mobile communication device 106. Examples of the communication network 110, include, but are not limited to, Internet, Intranet, MAN, LAN, and WAN.

The mobile communication device 106 is generally representative of mobile computing devices that are equipped with a touchscreen, Examples of the mobile communication device 106 include, but are not limited to, personal computer, laptop, personal digital assistant, tablet, phablet, webpad, wearable computer, mobile telephone, wrist-worn computer, and smart phone, The ticket issuing server 108 is generally representative of servers that execute a ticketing application 112 on the mobile communication device 106 for facilitating the ticket user 102 to purchase e-tickets/coupons for one or more events/services/activities. Examples of events include, sport events, concert, performance, and shows, and examples of services include hair dressing service, lunch service, and massage service. The e-tickets may also be bought for time limited permits such as 24 hour fishing permit.

The ticket issuing server 108 operates at a backend, and includes a ticket issuing server 114 and ticket database 116 for executing the ticketing application 112 on the mobile communication device 106, and providing a corresponding Graphical User Interface (GUI) therein. The GUI displays various events and their details such as location, capacity, number of available e-tickets, schedule, and visual outlook of the e-tickets, and facilitates the ticket user 102 to select an e-ticket and purchase the same using one of credit card payment, mobile payment, SMS payment, bank payment etc.

In an embodiment of the present disclosure, the e-ticket data is stored in the database 116 at the server 108, and is associated with metadata related to opening/using/checking the e-ticket. The metadata defines rules and actions related to usage of the e-ticket. Examples of rules may include, but are not limited to: enabling usage of the e-ticket only at certain time and/or location, and/or close to certain radio beacon such as Bluetooth or Wi-Fi beacon.

The ticket inspector 104 shown in FIG. 1 is generally present at a ticket inspection site. In one embodiment, the ticket inspector 104 physically inspects the e-ticket on the mobile communication device 106. The ticket inspector 104 performs a checking action on the mobile communication device 106 to allow the user to access the event/activity.

Figure 2:
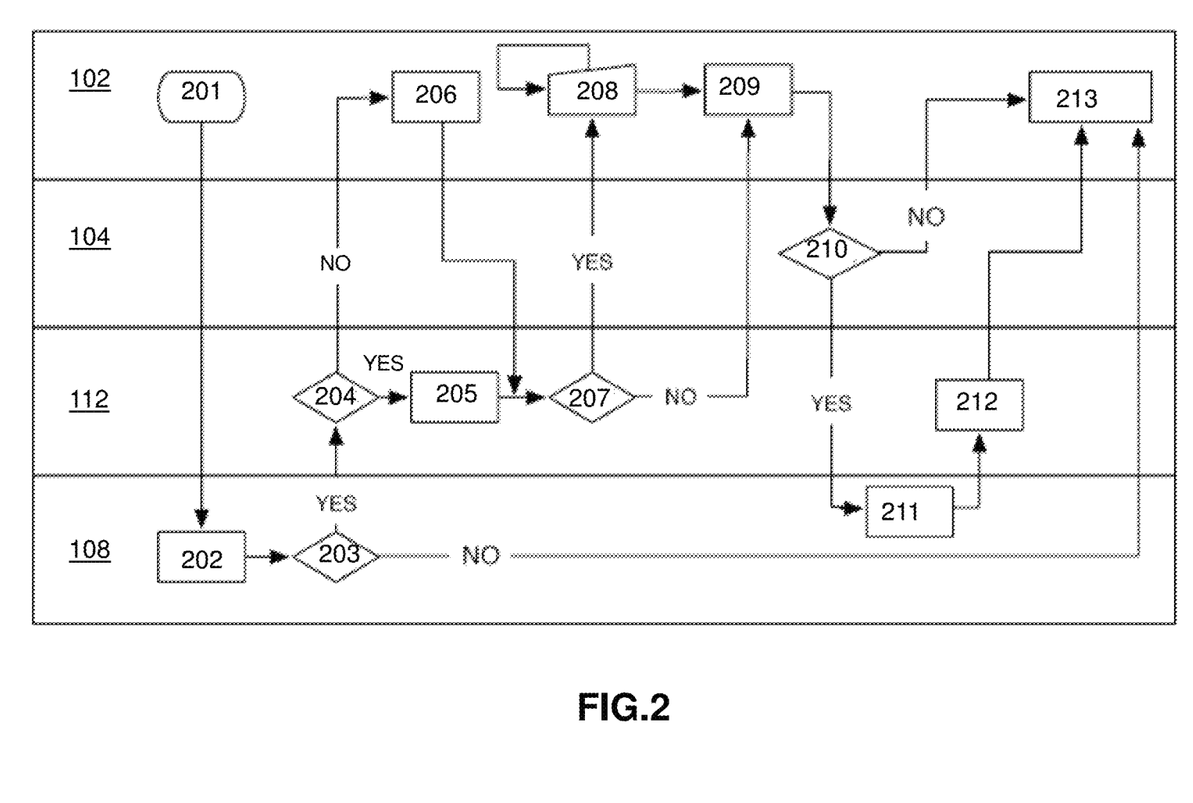
FIG. 2 is an illustration of an exemplary exchange of information among the ticket user, ticket inspector, ticketing application and the ticket issuing server for using and inspecting the e-ticket in accordance with an embodiment of the present disclosure.

FIG. 2 is an illustration of an exemplary exchange of information among the ticket user 102, ticket inspector 104, ticketing application 112 and the ticket issuing server 108 for using and inspecting the e-ticket, in accordance with an embodiment of the present disclosure.

At step 201, the ticket user 102 submits a request for using the e-ticket/voucher purchased from the ticket issuing server 108. In an embodiment of the present disclosure, the ticket user 102 may submit a request for using the e-ticket by clicking an icon on the e-ticket.

At step 202, the ticket issuing server 108 checks the status of the e-ticket upon receiving the request. In an embodiment of the present disclosure, the ticket issuing server 108 checks whether the e-ticket has been purchased from it, and if purchased, whether it has been used or not.

The ticket issuing server 108 then proceeds to step 203, to check the validity of the e-ticket based on one or more business rules set by corresponding event organizer. If the e-ticket is not valid according to the business rules, then the user 102 is not allowed to use the e-ticket, and the process goes to an end step 213.

If the e-ticket is found to be valid, then at step 204, the ticketing application 112 checks whether one or more notifications have been set for the e-ticket, for enabling the user to use the e-ticket only after receiving notifications.

If the notifications have been set for the e-ticket, then at step 205, the ticketing application 112 checks the notification criteria set for issuing notifications. The notification criteria can be time based or location based. For example, the notifications can be issued when the mobile communication device 106 is at a certain location. The notifications can also be issued at a certain time. In one embodiment, the notifications can be issued when the mobile communication device 106 is close to a certain radio beacon such as Bluetooth or Wi-Fi beacon. The e-ticket might be configured to show the information on the e-ticket related to usage of the e-ticket when in a certain location (such as close proximity of the event or close proximity to radio beacon on the event). In an example, a notification may be issued one hour before the event to automatically open the e-ticket and enable the user to use the e-ticket only within that one hour.

If the notifications have not been set for the e-ticket, then at step 206, the ticket user 102 opens the ticket manually as per his choice of time and location.

After opening of the e-ticket either manually or automatically, the ticketing application 112 checks at step 207, whether a password is associated with the e-ticket.

If a password is associated with the e-ticket, then at step 208, the ticketing application 112 prompts the user 102 to enter a password related to the e-ticket, and accepts a password therein.

Thereafter, at step 209, the ticketing application 112 prompts the user 102 to have the e-ticket inspected. This can including having the e-ticket inspected by the ticket inspector 104.

At step 210, the ticket inspector 104 inspects the e-ticket present in the mobile communication device 106 of the user 102. The ticket inspector 104 is generally present at a ticket inspection site, and inspects the e-ticket as per instructions issued by corresponding event organizer, which in turn receives instructions from the ticket issuing server 108 prior to the event. The instructions may be for example, "look for triangle on red background" or "look for red letter in leftmost position" in the e-ticket. If the e-ticket appears as per the instructions, the ticket inspector 104 executes a checking gesture in the e-ticket. An example of the checking gesture is, sliding the display screen from left to right in a ticket display area of the mobile communication device 106. If the e-ticket does not appear as per the instructions, the ticket inspector 104 does not execute the checking gesture, and does not allow the user 102 to attend the event, and the process goes to the end step 213.

If the ticket inspector 104 executes the checking gesture, then at step 211, the ticket issuing server 108 contacts the ticketing application 112, and provides a confirmation code for displaying on the mobile communication device 106.

At step 212, the ticketing application 112 displays the confirmation code on the mobile communication device 106. The confirmation code is one or more of an audio, visual and tactile signal. In one embodiment, the confirmation code is already known to the ticket inspector 104, such as by having been already communicated to the ticket inspector 104 by the event organizer before starting the event. If the confirmation code is same as the one communicated by the event organizer, the ticket inspector 104 allows the user to attend the event/to avail the service.

At step 213, the process ends.

Figure 3A:
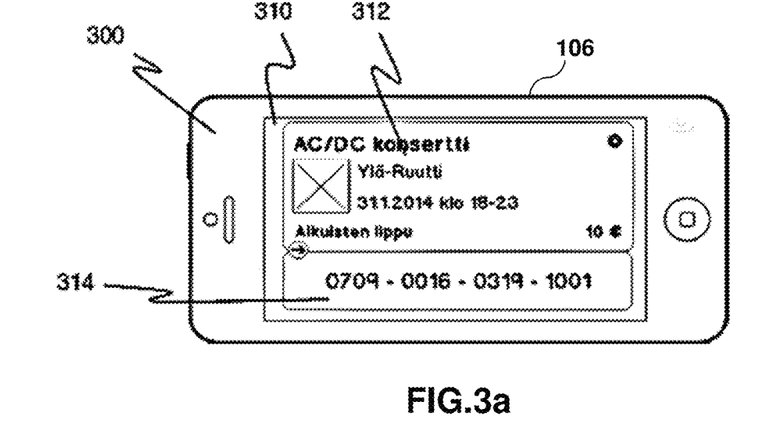
FIGS. 3a-3d are illustrations of exemplary GUIs of the ticketing application executing on the mobile communication device, in accordance with an embodiment of the present disclosure.

FIG. 3a is an illustration of an exemplary GUI 300 of the ticketing application 112 executing on the mobile communication device 106. The GUI 300 displays an e-ticket 310 purchased by the user 102. The e-ticket 310 includes a ticket information area 312 and a ticket validation area 314. The ticket information area 312 displays user related information about the e-ticket 310, such as title of the event "AC/DC konsertti", location of the event "Ylä-Ruutti", price "10 €", date "31$^{st}$ Jan. 2014" and time "18:00 pm-23:00 pm". The ticket information area 312 may also include information such as "Aikuisten lippu" indicating that the event is for adult customers only.

The ticket validation area 314 displays inspection related information which may be available either at the time of delivering the e-ticket 310 or after the mobile communication device 106 has satisfied the notification criteria, i.e. being present at a predefined time/location or close to a radio beacon. When the user hands over the mobile communication device 106 to the ticket inspector 104 for inspection, the ticket inspector 104 looks for one or more predefined identifiers in the ticket validation area 314. The predefined identifiers may be, for example, "a triangle on red background" or "red letter in leftmost position". In alternate embodiment, the predefined identifiers can comprise any suitable indicator or graphical symbol. When the e-ticket 310 appears as per instructions, the ticket inspector 104 executes a predefined gesture, such as sliding finger from left to right in top of the ticket validation area 314. In alternate embodiments, the predefined gesture can be any suitable gesture that can be executed on the GUI 300.

Figure 3B:
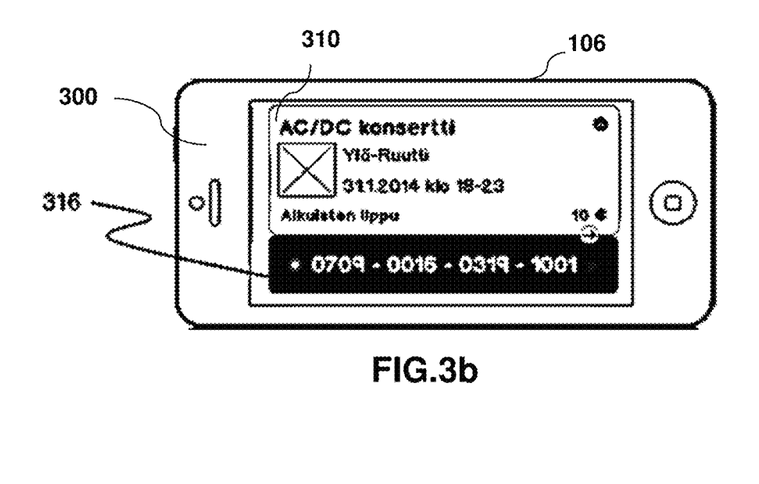

FIG. 3b is an illustration of the exemplary GUI 300 when or after the checking gesture executed by the ticket inspector 104 is detected. In this example, the e-ticket 310 displays a highlighted ticket validation area 316, which is being highlighted as the ticket inspector 104 executes the checking gesture. The highlighting of the ticket validation area 316 is beneficial to warn the user not to attempt to make the checking gesture themselves.

Figure 3C:
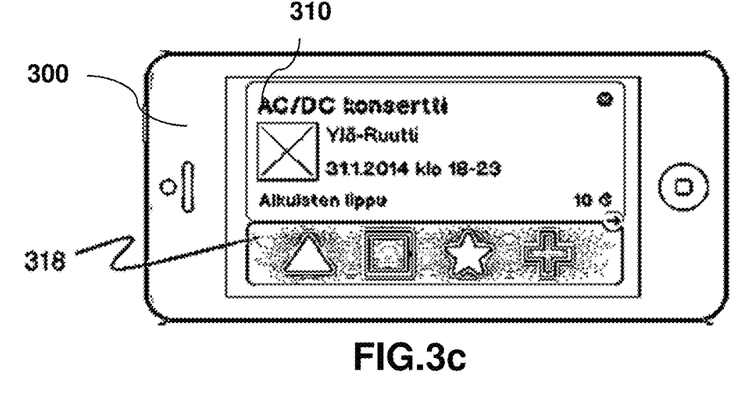

FIG. 3c is an illustration of the exemplary GUI 300 which displays a confirmation code 318 after detection of the execution of the checking gesture by the ticket inspector 104. The confirmation code 318 is one of: a predetermined audio, visual and/or a tactile signal. The confirmation code 318 can be generated only once for the e-ticket 310. The confirmation code 318 has already been set by the event organizer of the e-ticket 310, and has been communicated to the ticket inspector 104 before starting the event. If the confirmation code 318 is same as the one communicated by the event organizer, the ticket inspector 104 allows the user 102 to attend the event. The ticket inspector 104 may further execute a confirmation gesture in the ticket validation area 318 to update the server 108 that the e-ticket 310 has been used.

Figure 3D:
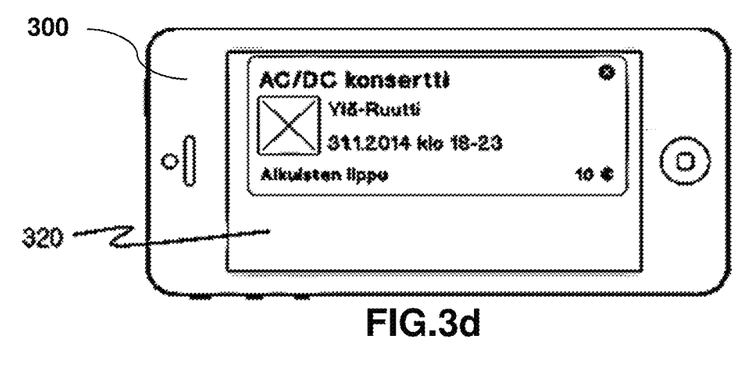

FIG. 3d is an illustration of the exemplary GUI 300 displaying a vacant ticket validation area 320. The vacant ticket validation area 320 indicates that the e-ticket 310 has been inspected by the ticket inspector 104 and has been used. Alternatively, a symbol or text can be shown in the vacant ticket validation area 320 to indicate that the ticket 310 has been used.

Figure 4A:
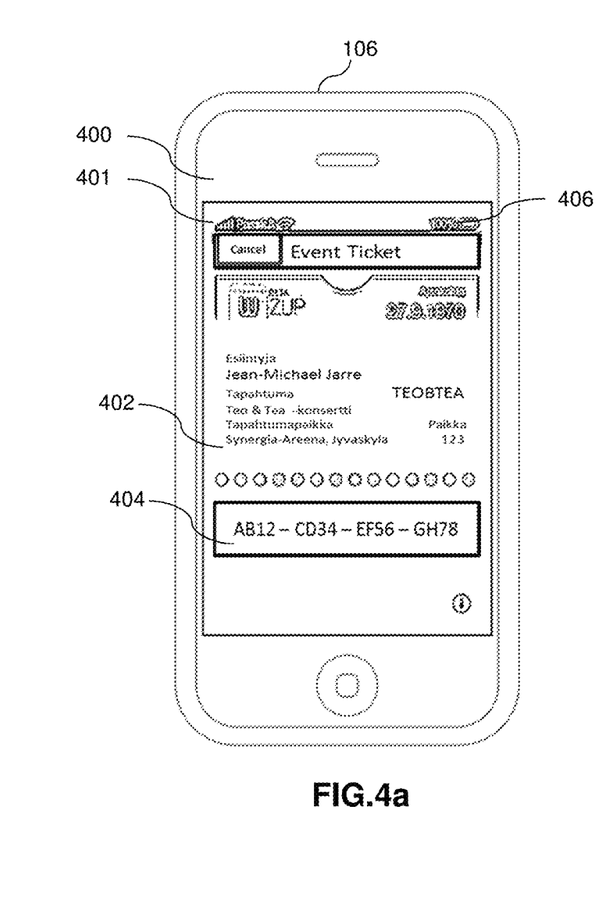
FIGS. 4a-4e are illustrations of exemplary GUIs of the ticketing application executing on the mobile communication device, in accordance with another embodiment of the present disclosure.

FIG. 4a is an exemplary GUI 400 of the ticketing application 112 executing on the mobile communication device 106. The GUI 400 displays an e-ticket 401 purchased by the user 102. The e-ticket 401 includes a ticket information area 402, which is an example of the ticket information area 312, and a ticket validation area 404, which is an example of the ticket validation area 314. The ticket information area 402 includes user related and publically available information about the e-ticket 401 such as event/service name, event schedule, service provider, duration, number of uses (if multiple), validity time, ticket serial number, and a video clip of an advertisement pertaining to the event/service.

The ticket validation area 404 includes inspection related information (information defining the inspection method) which may not be available till at least one predefined condition is met, in order to protect the e-ticket 401 from being accidentally de-authorized/used/deleted. The inspection related information may be either retrieved from the server 108 or is stored in a hidden and/or encrypted form in the device 106. In one embodiment of the present disclosure, the inspection related information is made available on the device 106 when a bring-up signal is received by the ticketing application 112. The bring-up signal may be automatically generated by the server 108 at a predefined time, or when the mobile communication device 106 is close to certain radio beacon such as Bluetooth or Wi-Fi beacon or NFC beacon, or when the mobile communication device 106 is present at a certain location, the location being sensed using GPS, WLAN access point etc. The inspection related information may be delivered from the server 108 to the mobile communication device 106 during bring-up process. Alternatively, the inspection related information is made available from the memory, when the device 106 receives the bring-up signal. Thus, the bring-up signal increases security and improves user experience by preventing the usage of the e-ticket 401 in a wrong place/time.

In another embodiment of the present disclosure, the inspection related information is independent of the bring-up signal from the server 108, and the user 102 has to manually bring up the e-ticket 401 using the ticketing application 112. In an example, the user 102 may bring up the e-ticket 401 manually by clicking on an icon 406 in a top right corner of the ticket information area 402. The icon 406 may disappear after the click, thus, allowing the user 102 to bring-up the e-ticket 401 only once. After the user 102 submits a request to the server 108 for bringing up the e-ticket 401, the server 108 checks the validity of the e-ticket 401, and renders the e-ticket 401 on the GUI 400.

Figure 4B:
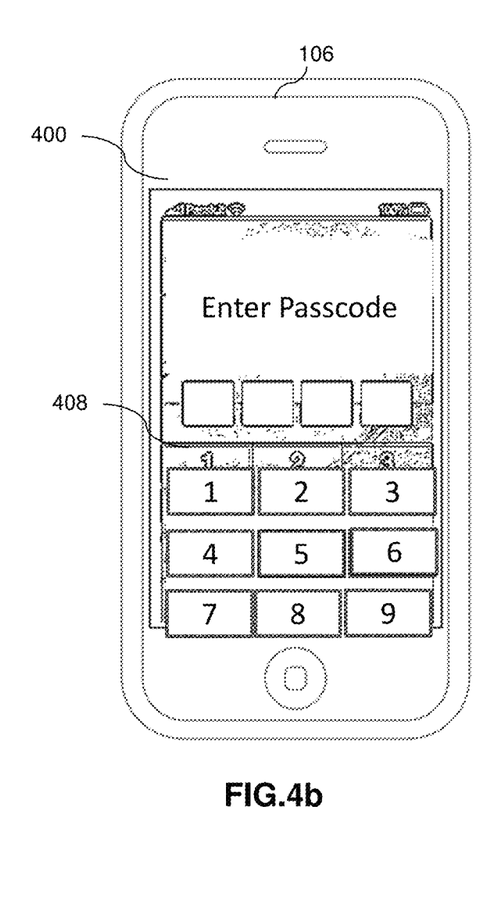

FIG. 4b is an illustration of the exemplary GUI 400 prompting the user 102 to enter a passcode 408 to confirm his willingness to use the e-ticket 401 and gain access to the inspection related information.

Figure 4C:
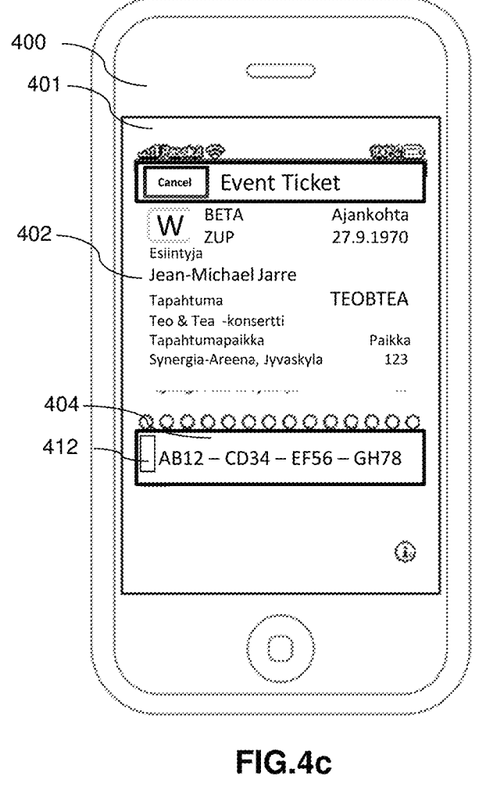

FIG. 4c is an illustration of the exemplary GUI 400 displaying the inspection related information in the ticket validation area 404 after the user enters the passcode 408. After entering of the passcode 408, the color, font, or text of the ticket validation area 404 may be changed to indicate that the e-ticket 401 is ready for inspection. The ticket validation area 404 also displays a check zone 412 which includes an identifier predefined by the issuing server 108 and communicated to the ticket inspector 104 beforehand. Examples of the predefined identifier include, but are not limited to a "triangle on red background", "red letter in leftmost position", etc. The inspector 104 looks in the check zone 412, and if it includes the predefined identifier, he executes the checking gesture in the ticket validation area 404. An example of the checking gesture is sliding a finger from left to right in the top of the area 404 for mimicking the "tearing" of the e-ticket 401. In alternate embodiments, any suitable gesture that can be executed on the GUI 400, detected and interpreted can be used. The checking gesture may vary with each e-ticket 401 and with each identifier of the check zone 412. A hint of the type of checking gesture may be hidden in the check zone 412. For example, when the background color of the check zone 412 is red, then the checking gesture is swiped from left to right at or along a top of the ticket validation area 404.I If the background color of the check zone 412 is green, then the checking gesture is a swipe forming the letter L in the ticket validation area 404.

During the execution of the checking gesture, a feedback may be provided to the ticket inspector 104 that he is about to inspect the ticket. The feedback may be triggered by executing a part of the checking gesture (e.g. 50%), and may be visual, audible, tactile, or an intensifying signal synchronized with the checking gesture. In an example, the feedback may be a changing color of the ticket validation area 404 or the check zone 412, or event specific audible sound or tactile pattern (e.g. vibration).

In one embodiment, the ticket validation area 404 and corresponding checking gesture is defined in such a way that it is improbable to execute the checking gesture by accident. For example, the checking gesture may be a simple swipe but the ticket validation area 404 is long and narrow, and does not extend close to the display edges so that the mobile device 106 could not interpret the checking gesture as a device operating system gesture. The safe distance from the display edges is roughly one centimeter, and the ticket validation area 404 should be roughly one centimeter wide, equivalent to width of a finger. Further, to ensure proper usability, the text contained in the e-ticket 401 should be at least 5 mm of height.

Figure 4D:
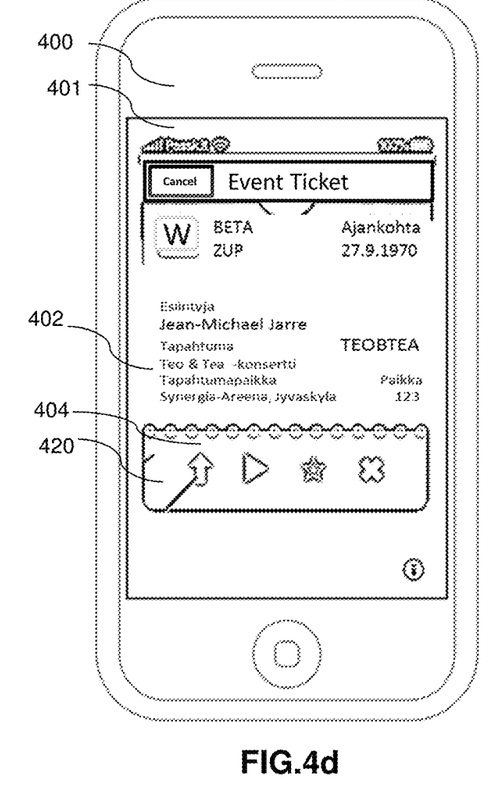

FIG. 4d is an illustration of the exemplary GUI 400 displaying a confirmation code 420 in the ticket validation area 404, after the checking gesture has been successfully executed by the ticket inspector 104. The confirmation code 420 may be visual, audible or tactile, and is typically a combination of characters, icons and colors. The confirmation code 420 is predefined for the e-ticket 401, and is delivered to the ticket inspector 104 prior to the event, so that the ticket inspector 104 is well aware of the confirmation code 420 for the e-ticket 401. The confirmation code 420 makes the copying or forging of tickets more difficult. A plain text such as "approved" in place of the code 420 could be easily copied and thus forged. If the confirmation code 420 does not match the expectation of the inspector 104, the user 102 is not allowed to attend the event, and the ticket inspector 104 may check in a ticketing system to ensure whether there is some error in the ticket or if it is a forged ticket.

If the confirmation code 420 matches the expectation of the inspector 104, he may confirm the validity of the e-ticket 401, again with a confirmation gesture, after which the e-ticket 401 is marked as used in the centralized ticket database 116 and the ticket inspector 104 grants access to the ticket user 102.

In another embodiment of the present disclosure, if the e-ticket 401 is used for a time-limited activity that extends for a predefined time period, such as 24-hour fishing permit, a time counter can be attached to the e-ticket 401 and the remaining usage time can be rendered in the GUI 400 in the context of displaying the e-ticket 401. The countdown of the counter may start at a predefined moment, e.g. at time of purchase of the e-ticket 401, or at time of user manual activation, or at time of user entering a location defined in the e-ticket 401. In the inspection phase of the time-limited activity, after executing the checking gesture, the ticket inspector 104 may input a predefined passcode using a keyboard rendered by the ticketing application 112. The passcode is typically a character sequence. When the ticket inspector 104 inputs a correct password code, he is provided a temporary confirmation code, which is a function of the pass code and ticket type. In such case, the ticket inspector 104 does not mark the e-ticket 401 as used, and its validity continues until end of the predefined time period. The end of validity is then displayed on the GUI 400.

Figure 4E:
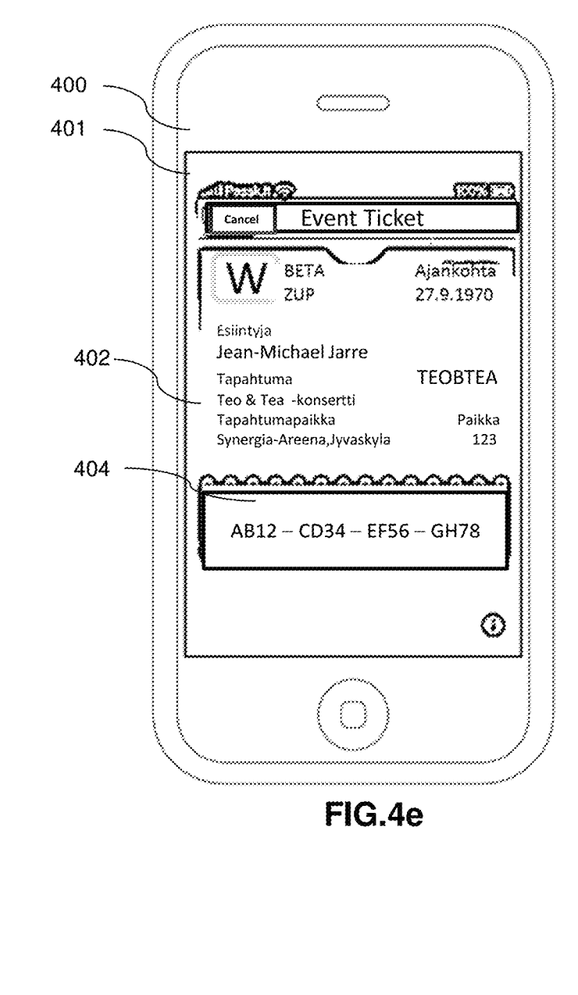

FIG. 4e is an illustration of the exemplary GUI 400 displaying the e-ticket 401 post inspection. The e-ticket 401 may be indicated as used by displaying a vacant ticket validation area 404, or by changing a background color of the e-ticket 401, or by having a color or a visual mark (like used) at a top of the e-ticket 401, or by changing information content of the e-ticket 401. After the e-ticket 401 has been used, the ticketing application 112 may automatically update the same to the ticket issuing server 108. If the ticketing application 112 does not have access to the communication network 110, and is not connected to the ticket issuing server 108, it may postpone updating the status of the e-ticket 401 till it is again connected to the communication network 110.

Figure 5A:
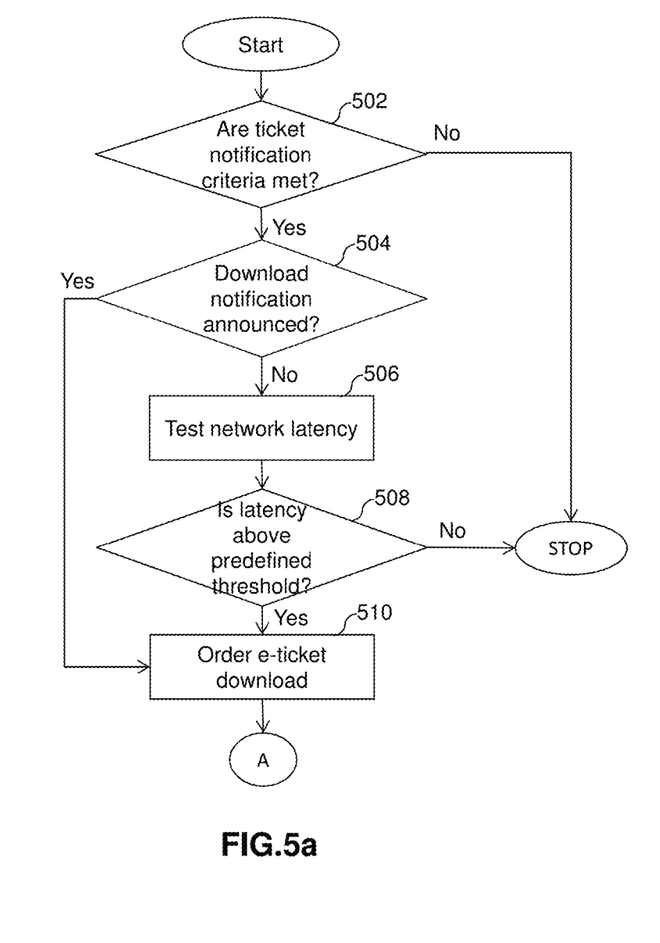
FIGS. 5a and 5b illustrate a method of delivering an e-ticket on the mobile communication device, in accordance with an embodiment of the present disclosure.

FIG. 5a is an illustration of a method of delivering an e-ticket on the mobile communication device 106, in accordance with an embodiment of the present disclosure. The method is depicted as a collection of steps in a logical flow diagram, which can be implemented using a variety of means, and may be collectively executed on the ticket issuing server 108 and the mobile communication device 106.

Figure 5B:
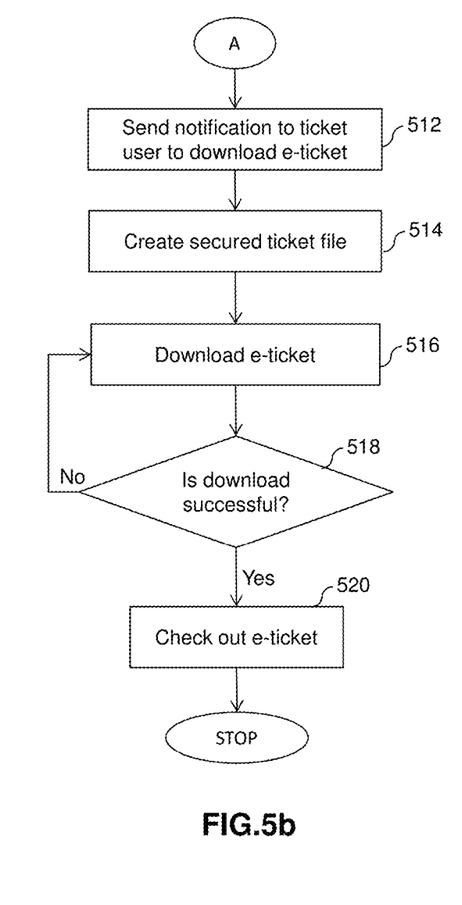

At step 502, it checked, whether the ticket notification criteria are met for issuing the bring-up signal and providing a download of the e-ticket at the mobile communication device 106. If the ticket notification criteria are not met, the process ends. Alternatively, it is checked at step 504, whether a download notification is announced on the display of the device 106 for enabling the user 102 to download the e-ticket. If the download notification is not announced, then at step 506, the network latency is tested. If it is determined at step 508, that the latency of the network is above a predefined threshold, the process ends. If it is determined at step 508, that the network latency is below the predefined threshold, then at step 510, the download of the e-ticket is ordered. Referring to FIG. 5b, at step 512, a notification is sent to the ticket user 102 to download the e-ticket. At step 514, a secured ticket file is created and at step 516, the e-ticket starts downloading onto the mobile communication device 106. At step 518, it is checked whether the download of the e-ticket is successful. When the download is successful, the e-ticket is checked out.

The e-ticket can be preloaded in the mobile device 106, automatically by the ticketing application 112 (on issuance of the bring-up signal) or manually by the user 102 (preferred when the communication network 110 is clogged). In the latter case, the server 108 marks the ticket status as transferred at the time of transfer of the e-ticket and stores the ticket data and related confirmation codes onto the memory of the mobile communication device 106 as protected/encrypted information (file), so that that the user 102 can use the e-ticket when its mobile communication device 106 is not connected to the communication network 110.

It should be noted here that the steps 502 to 518 in FIGS. 5*a* and 5*b* are only illustrative and other alternatives can also be provided where one or more steps are added, one or more steps are removed, or one or more steps are provided in a different sequence without departing from the scope of the claims herein.

Figure 6:
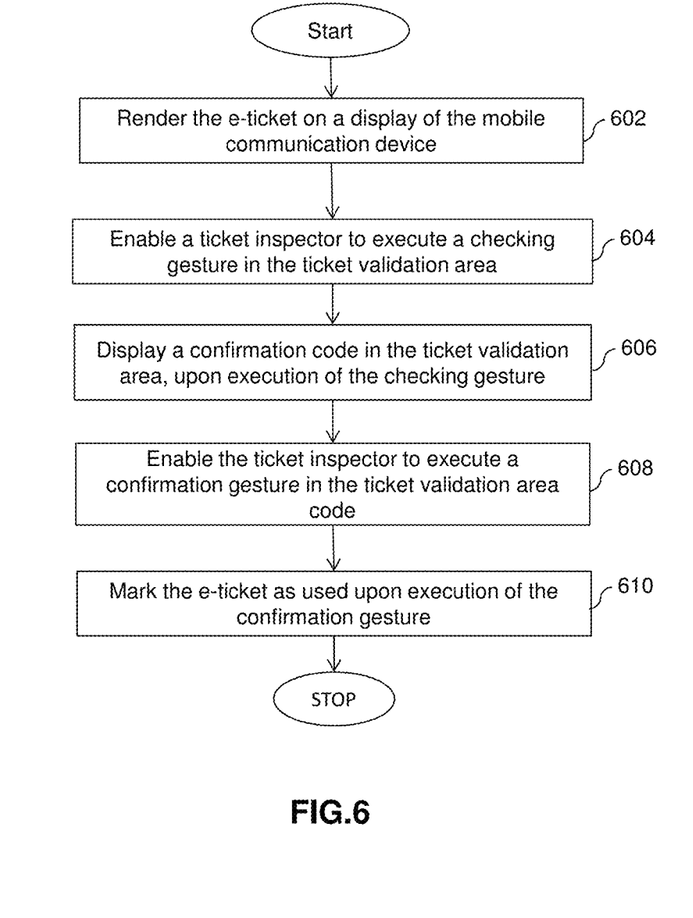
FIG. 6 is an illustration of a method of using and inspecting an e-ticket, in accordance with an embodiment of the present disclosure.

FIG. 6 is an illustration of steps of a method for inspecting an e-ticket on a mobile communication device 106 of a user, in accordance with the present disclosure. The method is depicted as a collection of steps in a logical flow diagram, which can be implemented using a variety of means.

At step 602, the e-ticket is rendered on a display of the mobile communication device 106, wherein the e-ticket includes a ticket information area for displaying user related information, and a ticket validation area for displaying inspection related information when at least one predefined condition is met.

At step 604, the ticket inspector 104 is enabled to execute a checking gesture in the ticket validation area when the ticket inspector 104 ascertains one or more predefined identifiers in the ticket validation area.

At step 606, a confirmation code is displayed in the ticket validation area, upon execution of the checking gesture.

At step 608, the ticket inspector 104 is enabled to execute a confirmation gesture in the ticket validation area when the displayed confirmation code matches a predefined confirmation code.

Finally at step 610, the e-ticket is marked as used upon execution of the confirmation gesture, and the user 102 is allowed to access activity corresponding to the e-ticket.

It should be noted here that the steps 602 to 610 are only illustrative and other alternatives can also be provided where one or more steps are added, one or more steps are removed, or one or more steps are provided in a different sequence without departing from the scope of the claims herein.

While the disclosure has been presented with respect to certain specific embodiments, it will be appreciated that many modifications and changes may be made by those skilled in the art without departing from the spirit and scope of the disclosure. It is intended, therefore, by the appended claims to cover all such modifications and changes as fall within the true spirit and scope of the disclosure.

What is claimed is:

1. A method for inspecting an e-ticket on a mobile communication device of a user, comprising:
rendering the e-ticket on a display of the mobile communication device, wherein the e-ticket includes a ticket information area for displaying user related information, and a ticket validation area for displaying inspection related information when at least one predefined condition is met;
enabling an execution of a checking gesture in the ticket validation area when one or more predefined identifiers are detected in the ticket validation area;
displaying a confirmation code in the ticket validation area, upon detection of an execution of the checking gesture;
enabling an execution of a confirmation gesture in the ticket validation area when the displayed confirmation code matches a predefined confirmation code; and
marking the e-ticket as used upon detection of an execution of the confirmation gesture.

2. The method as claimed in claim 1, further comprising providing a prompt on the display for the user to show the e-ticket to the ticket inspector when the inspection related information is displayed in the ticket validation area.

3. The method as claimed in claim 1, wherein the user related information includes at least one of: title, schedule, service provider, duration, location, date, time and price of the event.

4. The method as claimed in claim 1, wherein the inspection related information is stored in a hidden and/or encrypted form in a memory of the mobile communication device, until the at least one predefined condition is met.

5. The method as claimed in claim 1, wherein the inspection related information is automatically retrieved from a ticket issuing server, when the at least one predefined condition is met.

6. The method as claimed in claim 1, wherein the at least one predefined condition comprises one or more of: a ticket issuing server issuing a bring-up signal for the mobile communication device, and detection of a request for bringing up the e-ticket.

7. The method as claimed in claim 6, wherein the ticket issuing server issues the bring-up signal, when at least one notification criteria is satisfied, a notification criteria being one of: the mobile communication device being present at a predefined location, a current time of mobile communication device being a predefined time, and the mobile communication device being close to a radio beacon.

8. The method as claimed in claim 6 further comprising checking a status, validity and the at least one notification criteria of the e-ticket, upon detection of the request for bringing up the e-ticket.

9. The method as claimed in claim 1, wherein the confirmation code includes at least one of: audible code, visual signal, and tactile signal.

10. The method as claimed in claim 1 further comprising enabling the user to enter a password to display the inspection related information in the ticket validation area.

11. The method as claimed in claim 1, wherein the checking gesture is one of:
sliding a finger on the display from left to right in the ticket validation area, sliding a finger on the display from right to left in the ticket validation area, sliding a finger on the display from top to bottom in the ticket validation area, sliding a finger on the display from bottom to top in the ticket validation area, and sliding a finger on the display to form an L in the ticket validation area.

12. The method as claimed in claim 1, further comprising providing feedback during execution of the checking gesture, the feedback including at least one of: visual, audible and tactile signal.

13. The method as claimed in claim 1, wherein the checking gesture, the confirmation code, and the confirmation gesture are e-ticket specific.

14. The method as claimed in claim 1, wherein the e-ticket is issued to the user for an activity extending for a predefined time period.

15. The method as claimed in claim 14, further comprising:
rendering a countdown timer of the predefined time period on the display of the mobile communication device;
enabling an input of a passcode in the ticket validation area upon execution of the checking gesture;
displaying a temporary confirmation code in the ticket validation area upon a detection of an input of the passcode, the temporary confirmation code being a function of the passcode and e-ticket type; and marking the e-ticket as valid, and enabling a use of the e-ticket till an expiry of the predefined period.

16. A system for facilitating inspection of an e-ticket on a mobile communication device of a user, comprising:
a processor; and
a non-transitory computer readable medium, the non-transitory computer readable medium including program code stored thereon, wherein an execution of the program code by the processor enables the processor to:
render the e-ticket on a display of the mobile communication device, wherein the e-ticket includes a ticket information area for displaying user related information, and a ticket validation area for displaying inspection related information when at least one predefined condition is met;
enable an execution of a checking gesture in the ticket validation area when one or more predefined identifiers are detected in the ticket validation area;
display a confirmation code in the ticket validation area, upon a detection of the execution of the checking gesture;
enable an execution of a confirmation gesture in the ticket validation area when it is detected that the displayed confirmation code matches a predefined confirmation code; and
mark the e-ticket as used upon detection of the execution of the confirmation gesture.

17. The system as claimed in claim 16, wherein the user related information includes at least one of: title, schedule, service provider, duration, location, date, time and price of a corresponding activity.

18. The system as claimed in claim 16, wherein execution of the program code by the processor enables the processor to provide a prompt on the display of the device for the user to show the e-ticket to a ticket inspector when the inspection related information is displayed in the ticket validation area.

19. The system as claimed in claim 16, wherein the user related information includes at least one of: title, schedule, service provider, duration, location, date, time and price of the event.

20. The system as claimed in claim 16, wherein the inspection related information is stored in a hidden and/or encrypted form in a memory of the mobile communication device, until the at least one predefined condition is met.

21. The system as claimed in claim 16, wherein the inspection related information is automatically retrieved from a ticket issuing server, when the at least one predefined condition is met.

22. The system as claimed in claim 16, wherein the at least one predefined condition is one of: a ticket issuing server issuing a bring-up signal for the mobile communication device, or detecting a submission of a request on the display for bringing up the e-ticket.

23. The system as claimed in claim 22, wherein the ticket issuing server issues the bring-up signal, when at least one notification criteria is satisfied, a notification criteria being one of: the mobile communication device being present at a predefined location, a current time of mobile communication device being a predefined time, and the mobile communication device being close to a radio beacon.

24. The system as claimed in claim 22, wherein the execution of the program code by the processor enables the processor to check a status, validity and the at least one notification criteria of the e-ticket, when the request for bringing up the e-ticket is detected.

25. The system as claimed in claim 16, wherein the confirmation code includes at least one of: an audible code, a visual signal, and a tactile signal.

26. The system as claimed in claim 16, the execution of the program code by the processor enables the processor to provide a password entry screen to display the inspection related information in the ticket validation area.

27. The system as claimed in claim 16, wherein the checking gesture is one of:
sliding of a finger on the display from left to right in the ticket validation area, sliding of a finger on the display from right to left in the ticket validation area, sliding of a finger on the display from top to bottom in the ticket validation area, sliding of a finger on the display from bottom to top in the ticket validation area and sliding of a finger on the display to form an L in the ticket validation area.

28. The system as claimed in claim 16 wherein the execution of the program code by the processor enables the processor to provide feedback during execution of the checking gesture, the feedback including at least one of: a visual, an audible and a tactile signal.

29. The system as claimed in claim 16, wherein the checking gesture, the confirmation code, and the confirmation gesture are e-ticket specific.

30. The system as claimed in claim 16, wherein the e-ticket is issued for an activity extending for a predefined time period.

31. The system as claimed in claim 30, wherein the execution of the program code by the processor enables the processor to:
render a countdown timer of the predefined time period on the display of the mobile communication device;
enable an input of a passcode in the ticket validation area upon execution of the checking gesture;
display a confirmation code in the ticket validation area upon detection of the input of the passcode, the confirmation code being a function of the passcode and e-ticket type; and
mark the e-ticket as valid, and enabling use of the e-ticket further till an expiry of the predefined period.

* * * * *